United States Patent
Brown et al.

(10) Patent No.: US 10,052,852 B2
(45) Date of Patent: *Aug. 21, 2018

(54) NON-CHEMICAL THERMALLY PRINTABLE FILM

(71) Applicant: Toray Plastics (America), Inc., North Kingstown, RI (US)

(72) Inventors: Matthew H. Brown, Wakefield, RI (US); Harold E Koehn, North Kingstown, RI (US); Emilio Coletta, North Kingstown, RI (US)

(73) Assignee: TORAY PLASTICS (AMERICA) INC., North Kingstown, RI (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/252,184

(22) Filed: Aug. 30, 2016

(65) Prior Publication Data

US 2016/0368248 A1    Dec. 22, 2016

Related U.S. Application Data

(60) Division of application No. 14/555,096, filed on Nov. 26, 2014, now abandoned, which is a continuation of
(Continued)

(51) Int. Cl.
    *B32B 3/26*      (2006.01)
    *B32B 5/14*      (2006.01)
(Continued)

(52) U.S. Cl.
CPC ............ *B32B 27/08* (2013.01); *B29C 47/043* (2013.01); *B29C 47/065* (2013.01); *B29C 71/02* (2013.01); *B32B 3/26* (2013.01); *B32B 27/20* (2013.01); *B32B 27/205* (2013.01); *B32B 27/32* (2013.01); *B29K 2023/12* (2013.01); *B29K 2105/0005* (2013.01); *B29K 2105/0032* (2013.01); *B29L 2007/008* (2013.01); *B29L 2009/00* (2013.01); *B32B 2250/02* (2013.01);
(Continued)

(58) Field of Classification Search
CPC ...... B32B 27/08; B29C 47/043; B29C 47/065
See application file for complete search history.

(56) References Cited

U.S. PATENT DOCUMENTS 3,031,328 A    4/1962   Larsen
3,298,895 A    1/1967   Plambeck, Jr.
(Continued)

FOREIGN PATENT DOCUMENTS

CA         2551526     7/2005
EP         0865909     5/2007

*Primary Examiner* — Victor S Chang
(74) *Attorney, Agent, or Firm* — Davé Law Group, LLC; Raj S. Davé

(57) ABSTRACT

A two-layer mono-axially oriented film includes a first layer of an opaque beta-nucleated microvoided propylene-based polymer; and a second layer containing a dark pigment that is adapted for use in a thermal printer in which the thermal print-head contacts the exposed surface of the first layer. The dark pigment of the second layer pigment has a color contrasting with the color of the first layer and can contain a carbon black. The first layer includes microvoids and may be made transparent upon the application of heat by collapsing the voids of the first layer or upon the application of ultra-sonic energy.

11 Claims, 2 Drawing Sheets

Related U.S. Application Data application No. 13/857,374, filed on Apr. 5, 2013, now Pat. No. 8,968,863.

(60) Provisional application No. 61/621,173, filed on Apr. 6, 2012.

(51) Int. Cl.
*B32B 7/12* (2006.01)
*B32B 27/08* (2006.01)
*B32B 27/32* (2006.01)
*B32B 27/20* (2006.01)
*B29C 47/04* (2006.01)
*B29C 47/06* (2006.01)
*B29C 71/02* (2006.01)
*B29K 23/00* (2006.01)
*B29K 105/00* (2006.01)
*B29L 7/00* (2006.01)
*B29L 9/00* (2006.01)

(52) U.S. Cl.
CPC . *B32B 2250/242* (2013.01); *B32B 2307/4026* (2013.01); *B32B 2307/41* (2013.01); *B32B 2307/412* (2013.01); *B32B 2307/516* (2013.01); *B32B 2307/518* (2013.01); *B32B 2307/75* (2013.01); *B32B 2519/00* (2013.01); *Y10T 428/24901* (2015.01); *Y10T 428/24996* (2015.04); *Y10T 428/24998* (2015.04); *Y10T 428/249953* (2015.04); *Y10T 428/249958* (2015.04); *Y10T 428/249978* (2015.04); *Y10T 428/249982* (2015.04); *Y10T 428/31938* (2015.04)

(56) References Cited

U.S. PATENT DOCUMENTS

| | | |
|---|---|---|
| 4,004,065 A | 1/1977 | Matsushita et al. |
| 4,415,615 A | 11/1983 | Esmay et al. |
| 4,598,003 A | 7/1986 | Renholts |
| 4,602,265 A | 7/1986 | Philpott et al. |
| 4,780,357 A | 10/1988 | Akao |
| 4,975,469 A | 12/1990 | Jacoby et al. |
| 5,134,174 A | 7/1992 | Xu et al. |
| 5,863,859 A | 1/1999 | Uytterhoeven et al. |
| 6,104,422 A | 8/2000 | Kuboyama et al. |
| 6,277,474 B1 | 8/2001 | Murschall et al. |
| 2008/0233290 A1 | 9/2008 | Ward-Askey et al. |
| 2009/0031921 A1 | 2/2009 | Ward-Askey et al. |
| 2012/0308789 A1 | 12/2012 | Lockhart et al. |

NON-CHEMICAL THERMALLY PRINTABLE FILM

CROSS REFERENCE RELATED APPLICATION

The present application is a divisional of U.S. patent application Ser. No. 14/555,096, filed Nov. 26, 2014, which is a continuation of U.S. patent application Ser. No. 13/857,374, filed Apr. 5, 2013, now U.S. Pat. No. 8,968,863, issued Mar. 3, 2015, which claims the benefit of priority to U.S. Provisional Patent Application No. 61/621,173, filed Apr. 6, 2012 and is being incorporated by reference herein in their entireties.

FIELD OF THE INVENTION

This invention relates to an oriented propylene-based film which exhibits an appearance change when subjected to heat that does not involve any chemical change. This film is well-suited as a label film that can be activated by a thermal print-head to provide custom information. This invention provides a visual change based on a nonreversible physical change in the film, obviating the need for chemical reactive coatings or at least minimizing the amount of coating used. Another feature of this invention is that it is not limited to a black-and-white color contrast for images or graphics. Activation can also be accomplished by ultrasonic means.

This film is suitable as an "on-demand" label film for custom labeling, bar-code printing, cash register receipts, for consumer, industrial, and retail applications. It may be part of a laminate structure involving multiple films, or as a single laminate web for these applications.

BACKGROUND OF THE INVENTION

For creating custom information on labels, such as data or bar codes, or even cash receipts, a common practice has been to coat either paper or plastic substrates with a thermal reactive ink that reacts to the heat from a thermal print-head to create a visible contrast on the substrate material.

With the increasing scrutiny of Bisphenol-A—which is a common ingredient or component of such thermal ink coatings—the current thermal printable papers are under increasing pressure to change the composition of the chemicals that create this color contrast. The current approach with thermally reactive coated papers or labels leaves unreacted chemicals on the substrate surface which can expose the public consumer to doses of chemicals that have been shown to have detrimental side effects particularly in children but also in adults, even at low exposure dosages.

Another problem with thermal-change inks is that the image is not stable. It is common knowledge that with time, faxes, receipts, and labels that are printed with these thermal inks often either fade or go completely dark with aging. This is particularly true if exposed to higher temperatures or sunlight.

U.S. Pat. No. 4,004,065 describes a heat sensitive recording member composed of a support and a heat sensitive layer overlying the support. The heat sensitive layer contains an iron salt of a higher fatty acid and gallic acid as color forming components, a stilbene series fluorescent dye as an unusual color forming inhibitor, and hydroxypropyl cellulose and hydroxypropyl methyl cellulose.

U.S. Pat. No. 4,602,265 describes a heat sensitive color-producing multilayer coating including a first coating layer formed from a base polymeric coating composition comprising a solution of film-forming polymer, a source of polyvalent metallic ions, and at least one fatty add or derivative thereof; a second coating layer, on the first coating layer, formed from a sensitizing coating composition comprising a solution of organic film-forming polymer, at !east one fatty acid or derivative thereof, and a reducing agent selected from catechol, pyrogallol, hydroquinone, diphenyl carbazides, thereof; and a third coaling layer, on the second coating layer formed from a base polymeric coaling composition as defined above.

U.S. Pat. No. 5,863,859 describes a heat-sensitive recording material suited for use in direct thermal imaging, wherein the recording material includes: (i) a layer (1) uniformly distributed in a film-forming water-insoluble resin binder a substantially light-insensitive organic metal salt, preferably a silver salt, and (ii) a layer (2) in direct contact with said layer (1) or in thermal working relationship therewith through the intermediary of a spacer layer (3), characterized in that the layer (2) contains, uniformly distributed in a film-forming water-soluble hydrophilic binder at least one organic reducing agent that is capable of diffusing out of said layer (2) Into said layer (1) on heating said recording material, and is coated from an aqueous solution.

U.S. Patent Publication No. 2008/0233290 A1 describes a method of preparing a thermally printable sheet which includes providing a substrate including a base sheet having at least one surface coated with a layer containing a pigment in solid porous particulate form, and, using a printer, printing onto the coated surface of the substrate, a thermal ink which includes a color former, a color developer, which can be bisphenol A., and a sensitizer, characterized in that the sensitizer includes dimethyl terephthalate and the ink also includes at least one pigment. This publication also discloses a thermally printable sheet suitable for use In such a method.

U.S. Patent Publication No 2009/0031921 A1 describes a thermal ink which includes a color former, a color developer and a sensitizer, in which the color former can be 3-dibutylamino-6-methyl-7-an.anilinofluoran; the color developer can be bisphenol A; and the sensitizer can be dimethyl terephthalate, and the ink also comprises at least one pigment This ink may be used in thermal papers to reduce unwanted discoloration during storage.

U.S. Pat. No. 6,104,422 describes a sublimation thermal image transfer recording method for thermally forming images on an image-receiving sheet prepared by forming a dye-receiving layer on a substrate. The dye-receiving layer contains a subliminal dye-containing ink, such as C. I. Disperse, Yellow, Red, Blue; and a binder resin such as polyvinyl butyral or styrene-maleic acid copolymer.

U.S. Pat. No. 4,415,615 describes a cellular pressure-sensitive adhesive membrane including 15 to 85'% voids that does not collapse after being briefly compressed, has remarkably good adhesion on contact with rough surfaces and remarkably good flexibility and conformability at sub-freezing temperatures.

U.S. Pat. No. 5,134,174 describes biaxially oriented microporous polypropylene films made using beta-nucleation and specific processing temperatures. The micro porous films are open-celled with a high porosity of 30-40% with average pore size of 200-800. Angstroms.

U.S. Pat. No. 4,975,469 describes oriented porous polypropylene-based films using beta-nucleating agents. The pores have typical diameters ranging from 0.2 to 20 microns and inter-connect with each other and are "open-celled" such that the porous film exhibits a high moisture vapor transmission rate of about 2500-7500 g/m²/day. The beta-crystalline portions are extracted via a sol vent to form a porous film.

Canadian patent application No. CA02551526 describes a biaxially oriented white polypropylene film for thermal transfer recording including a polypropylene resin of 30% or higher beta crystal ratio and 140-172° C. melting temperature, in which the biaxially oriented white polypropylene film has substantially non-nucleated voids. A receiving layer is provided on one side of the film for thermal transfer recording in which the receiving layer includes at least one or more kinds of resin selected from polyolefin, acryl-based resin, polyester-based resin, and polyurethane based resin.

SUMMARY OF THE INVENTION

This invention addresses the issue of potential chemical hazards used in thermally-reactive coated substrates by making a label film that can create a distinct visual contrast via a physical change to the film. The invention eliminates the need for unreacted chemicals to create customizable labels. By using the micro-voids formed by beta-nucleation of the propylene-based substrate in the top visual print layer and the selective application of heat from a thermal print-head to specific portions of this micro-voided top layer (i.e. in the shape of images or alphanumeric characters), the beta-nucleated voids collapse and thus provide a transparent film in the heated areas. This contrast between an opaque, white microvoided area and a non-voided transparent area allows the formation of discrete images and alphanumeric characters as desired. In addition, since the temperature required to collapse the microvoids is much higher than typical ambient conditions, such images are expected to be more durable and resistant to fading over time and ambient environmental exposure than the current art using thermally-reactive coatings and inks.

The film of this invention works with a non-reversible physical change in the structure of the film to go from an opaque white or Light-colored appearance that is due to micro-voids in the film, to selectively collapsing or eliminating the voids to provide a transparent, clear film in the area where heat has been applied. By laminating the film to a darker-colored or contrasting colored substrate- or by coating one side of the film with a dark-colored or contrasting colored ink or coating—such contrasting colors will show through the clear or transparent areas of the inventive film. As this visual change (from white to clear) requires enough heat to change the structure of the film, i.e., a softening point of about 148° C., it is not likely that the custom information would fade or be converted over a wide area due to aging or ambient environmental conditions, such as exposure to sunlight or other outdoor weather conditions.

Polypropylene is not known for its resistance to sunlight but a short exposure of a few days or even up to a year, would not be expected to have any effect on the film's imagery after thermal printing. Nevertheless, robustness to prolonged exposure, such as is need for an agricultural plant tag, could be provided by modifying the film to incorporate an UV stabilizer or blocker to preserve the polypropylene and ensure durability in harsher environmental conditions.

A dark background would be necessary to create a good contrast where the "thermal print" is to occur, but the color does not need to be restricted to black or white. The white surface, while easiest to create with the micro-voids, may also be colored or pigmented, as long as the color would consist of a transparent pigment, which would still result in sufficient contrast against the dark background. Similarly, the contrasting color need not be black but any suitable color or shading that provides enough contrast with the micro-voided film to distinguish the "printed" information for the naked eye or machine readers.

The background on creating the micro-voided or cavitated film was in the food packaging industry, so all the components of the film can easily be made to comply with FDA packaging standards. Specifically, the method to create this film utilizes a beta-crystalline nucleating agent for polypropylene. Polypropylene can exist in several crystalline forms: alpha, beta, gamma, delta, and smectic crystal forms. Of interest in this invention are the alpha and beta forms. The specific conditions to produce a polypropylene article rich in beta-crystals is well-known in the art, typically requiring specific processing conditions and usually with a specific beta-nucleating agent. In this invention, it requires a hot casting roll that, in conjunction with the nucleator additive, causes the formation of a less dense beta crystalline form for the crystal portions of the semicrystalline polypropylene film. When this resulting film is stretched or oriented in the machine direction, the beta crystal changes to the "preferred" denser alpha crystal form for polypropylene. This change in density creates small micro-voids that, with the orientation, are enlarged enough such that the voids impart a white, opaque appearance to the film. This cavitation is also shown by a reduced density in the resulting film. Stretching the sheet either monoaxially or biaxially produces opaque, cavitated film with lowered density, high strength, and enhanced printability.

One embodiment is a two-layer mono-axially oriented coextruded film (MOPP) including a microvoided main layer A of a propylene-based polymer including an impact ethylene-propylene copolymer and an amount of beta-crystalline nucleating agent; and a second layer B of a propylene-based polymer including a crystalline isotactic propylene homopolymer and an amount of pigment such as a carbon block pigment; in which the second layer B is contiguously attached to one side of layer A and is coextruded as a skin layer or sublayer with the main layer A. This second layer B is not required to be microvoided.

Another embodiment is as a two-layer laminate structure in which one layer A is a microvoided mono-axially oriented extruded film or sheet including an impact ethylene-propylene copolymer and an amount of beta-crystalline nucleating agent; and a second layer B is a pigmented sheet or film including a polymeric or paper sheet containing a pigment, (preferably a color that is in contrast with layer A's color or appearance). Layer B is laminated or adhered contiguously to one side of layer A by various means well-known in the art, such as adhesive lamination or extrusion lamination processes. Layer B is not required to be microvoided.

In an another embodiment, it can also be contemplated to coat the second layer B onto one side of main layer A (as described in the previous embodiments) by various means well-known in the art such as extrusion-coating or solution coating. For example, it can be contemplated to extrusion-coat a polyethylene-including melt or other polymeric coating such as polypropylene or other polymer types (it may also be contemplated to use tie-resin materials, layers, primers, discharge-treating, etc., as needed to improve bonding between layers A and B), pigmented with carbon black (or other color suitably contrasting with layer A), onto one side of layer A.

In yet another embodiment, it can be contemplated to apply layer B onto one side of layer A (as described in the previous embodiments) in which layer B is comprised of an ink or inks which provide a contrasting color to layer A. The inks may be solvent-borne or aqueous (or UV or electron-beam curable ink systems), and may be applied by various means well-known in the art such as flexographic plates or rotogravure rolls; in addition, it can be contemplated to use primers or other materials to improve bonding of the inks to layer A. It can also be contemplated to discharge-treat the side of layer A which is to receive layer B printing inks by various means well-known in the art such as corona, flame, or atmospheric plasma treating systems; as well as using priming materials in combination with discharge-treatment methods. It may also be contemplated to apply the layer B printing inks as full coverage over the chosen side of layer A or as a discrete pattern, preferably in alignment with the desired thermal printing pattern applied to layer A by a thermal head printer. This latter embodiment may be useful as a cost-savings method to reduce the amount of ink coverage needed.

All these embodiments may also include additional additives in layer A and/or B, such as antiblock particles, slip agents, process aids, antistatic agents, defoamers, adhesion promoters, etc., as needed to enhance processability and other film handling properties. These additives may be added in quantities as described later in the specification so as not to materially affect or interfere with the basic properties of the film of this invention.

This invention provides a method to impart thermal print images and information via the application of heat only, or with ultrasound, and without the need of a chemical change of a thermally active compound. Additional advantages of this invention will become readily apparent to those skilled in the art from the following detailed description, wherein only the preferred embodiments of this invention are shown and described, simply by way of illustration of the best mode contemplated for carrying out this invention. As will be realized, this invention is capable of other and different embodiments, and its details are capable of modifications in various obvious respects, all without departing from this invention. Accordingly, the examples and description are to be regarded as illustrative in nature and not as restrictive.

BRIEF DESCRIPTION OF THE DRAWINGS

FIG. 1 is a perspective view of a film according to an embodiment of the invention. Shown is a mono-oriented polyolefinic film 100, comprised of two layers. Layer 101 is a white or light-colored/pigmented opaque beta-nucleated and micro-voided polypropylene layer. Layer 102 is a black or dark-colored/pigmented polypropylene layer upon one side of Layer 101. The side of 101 opposite to 102 is the thermal print side.

DETAILED DESCRIPTION OF THE INVENTION

In one embodiment of the invention, the laminate film is a two-layer mono-oriented coextruded film including a first layer A of a polyolefin resin layer including a propylene-based polymer and an amount of a beta-nucleating agent or beta-nucleated propylene polymer; and a second layer B coextruded with layer A contiguously upon one side of layer A. Layer B is comprised also of a propylene-based polymer and an amount of carbon black pigment in propylene-based polymer carrier resin. If desired, one or both sides of the laminate film structure may be discharge-treated.

The coextruded polyolefin resin layers A and B were uniaxially (or monoaxially) oriented. It can be contemplated to biaxially orient the laminate film as well in both the machine (MD) and transverse (TO) directions. The propylene-based polymer can be an isotactic ethylene-propylene impact copolymer with an ethylene-propylene rubber content of about 10-30 wt % of the polymer wherein the ethylene content of the rubber is about 10-80 wt % of the rubber. Typically, the copolymer is an ethylene-propylene copolymer, an ethylene-butene copolymer, a propylene-butene copolymer, or an ethylene-propylene-butene copolymer. Preferably, an ethylene-propylene or ethylene-propylene-butene copolymer is used. The copolymer may be an elastomer or plastomer. A thermoplastic elastomer can be described as any of a family of polymers or polymer blends (e.g. plastic and rubber mixtures) that resemble elastomers in that they are highly resilient and can be repeatably stretched and, upon removal of stress, return to close to its original shape; is melt-processable at an elevated temperature (uncrosslinked); and does not exhibit significant creep properties. Thermoplastic elastomers typically have a density of between 0.860 and 0.890 g/cm3 and a molecular weight Mw of 100,000 or greater. Plastomers differ from elastomers: a plastomer can be defined as any of a family of ethylene-based copolymers (i.e. ethylene alpha-olefin copolymer) which has properties generally intermediate to those of thermoplastic materials and elastomeric materials (thus, the term "plastomer") with a density of less than about 0.900 g/cm$^3$ (down to about 0.865 g/cm$^3$) at a molecular weight Mw between about 5000 and 50,000, typically about 20,000 to 30,000. Plastomers generally have an ethylene crystallinity between thermoplastics and ethylene alpha-olefin elastomers and are generally of a higher crystallinity than elastomers (which can generally be considered amorphous). As such, plastomers generally have better tensile properties than elastomers.

A suitable example of ethylene-propylene impact copolymer for this invention is Total Petrochemical's 5571. This resin has a melt flow rate of about 7 g/10 minutes at 230° C., a melting point of about 160-165° C., a Vicat softening point of about 148° C., and a density of about 0.905 g/cm$^3$. Another example of ethylene-propylene impact copolymer can be Total Petrochemical's 4180 with a melt flow rate of about 0.7 g/10 minutes at 230° C., a melting point of about 160-165° C., a Vicat softening point of about 150° C., and a density of about 0.905 g/cm$^3$. Other suitable ethylene-propylene impact copolymers can be Braskem's TI-4015-F with an ethylene-propylene rubber of 10-30 wt %, a melt flow rate of 1.6 g/10 minutes at 230° C., melting point of 160-165° C., Vicat softening point of 148° C., and a density of about 0.901 g/cm$^3$; and ExxonMobil Chemical's PP7033E2 with a melt flow rate of about 8 g/10 minutes at 230° C. and a density of about 0.9 g/cm$^3$.

Other suitable propylene-based polymers can be isotactic crystalline propylene homopolymers and "mini-random" isotactic crystalline ethylene-propylene copolymers. "Mini-random" propylene homopolymers are those class of ethylene-propylene copolymers in which the ethylene content is fractional, i.e. less than 1 wt %, typically on the order of about 0.2-0.8 wt %, and preferably about 0.5-0.7 wt %. These crystalline isotactic polypropylenes are generally described as having an isotactic content of about 90% or greater as measured by C13 NMR. Suitable examples of crystalline propylene homopolymers for this invention are Total Petrochemicals 3271 and 3373HA, Phillips CH016 and CR035, and Braskem FF018. These resins also have melt flow rates of about 0.5 to 5 g/10 min at 230°, a melting point of about 163-167° C., a crystallization temperature of about 108-126° C., a heat of fusion of about 86-110 J/g, a heat of crystallization of about 105-111 J/g, and a density of about 0.90-0.91. Higher isotactic content propylene homopolymers (i.e. "high crystalline" homopolymers) may also be used. Suitable examples of these include those made by Total Petrochemicals 3270 and 3273 grades, Braskem grade HR020F3, and Phillips 66 CH020XK. These high crystalline polypropylenes typically have an isotactic content of 93% or greater as measured by 13C NMR spectra obtained in 1,2,4-trichlorobenzene solutions at 130° C. The % percent isotactic can be obtained by the intensity of the isotactic methyl group at 21.7 ppm versus the total (isotactic and atactic) methyl groups from 22 to 19.4 ppm. These resins also have melt flow rates of about 0.5 to 5 g/10 min, a melting point of about 163-167° C., a crystallization temperature of about 108-126° C., a heat of fusion of about 86-110 J/g, a heat of crystallization of about 105-111 J/g, and a density of about 0.90-0.91.

In the case of using high crystalline propylene homopolymers, it may also be contemplated to employ processing aids to help improve orientation, lowering orientation stresses, uneven stretching marks, motor draw amps, etc. Examples of suitable processing aids can be those based on hydrocarbon resins of various types. In particular, polydicyclopentadiene hydrocarbon resins are preferred processing aids as having good clarity, no smoking issues, no odor issues, and good miscibility with propylene-based resins. As a processing aid, inclusion of the hydrocarbon resin allows a wider "processing window" in terms of processing temperatures for machine direction (MD) and/or particularly, transverse direction (TD) orientation. A suitable hydrocarbon resin is of the polydicyclopentadiene type available in masterbatch form from ExxonMobil as PA639A, which is a 40% masterbatch of polypropylene carrier resin and 60% hydrocarbon resin. Suitable amounts of the hydrocarbon masterbatch to use in Layer A and/or B are concentrations of up to 10% masterbatch or up to 5% of the active hydrocarbon resin component. The pure hydrocarbon resin can also be obtained (i.e. not as a masterbatch) as ExxonMobil PR100A.

Suitable examples of propylene-based random copolymers for this invention are: Total Petrochemicals Z9421 ethylene-propylene random copolymer elastomer of about 5.0 g/10 min melt flow rate (MFR) at 230° C., melting point of about 120° C., density 0.89 g/cm³, and ethylene content of about 7 wt % of the polymer; Total Petrochemicals 8473 ethylene-propylene random copolymer of about 4.0 MFR at 230° C. and ethylene content of about 4.5 wt % of the polymer; Sumitomo Chemical SPX78R1 ethylene-propylene-butene random copolymer of about 9.5 g/10 min MFR at 230° C., ethylene content of about 1.5 wt %, and butene content of about 16 wt % of the polymer; or ExxonMobil Chemical Vistamaxx™ ethylene-propylene random copolymer elastomers such as grade 3980 FL with an MFR of about 8.3 g/10 min at 230° C., Vicat softening point of about 80° C., melting point of about 79° C., density of about 0.879 g/cm³, and ethylene content of about 8.5 wt %. Other suitable propylene-based copolymers and elastomers may be contemplated including but not Limited to: metallocene-catalyzed thermoplastic elastomers like ExxonMobil's Vistamaxx™ 3000 grade, which is an ethylene-propylene elastomer of about 11 wt % ethylene content, 8 g/10 min MFR at 230° C., density of 0.871 g/cm³, $T_g$ of –20 to –30° C., and Vicat softening point of 64° C.; or ethylene-propylene alpha-olefin copolymer plastomers of Dow Chemical's Versify™ grades, such as grade 3300, which is an ethylene-propylene plastomer of about 12 wt % ethylene content, 8 g/10 min MFR at 230° C., density of 0.866 g/cm³, $T_g$ of –28° C., and Vicat softening point of 29° C.; and Mitsui Chemicals Tafmer™ grades XM7070 and XM7080 metallocene-catalyzed propylene-butene random elastomers of about 22 and 26 wt % butene content, respectively. They are characterized by a melting point of 75° C. and 83° C., respectively; a Vicat softening point of 67° C. and 74° C., respectively; a density of 0.883-0.885 g/cm³; a $T_g$ of about –15° C.; a melt flow rate at 230° C. of 7.0 g/10 minutes; and a molecular weight of 190,000-192,000 g/mol.

Additionally, an amount of inorganic antiblocking agent may be optionally added up to 5000 ppm to either or both resin Layers A and B as desired for film-handling purposes, winding, antiblocking properties, and control of coefficient of friction. Preferably 300-5000 ppm, and more preferably 500-1000 ppm, of antiblock may be added. Suitable antiblock agents comprise those such as inorganic silicas, sodium calcium aluminosilicates, crosslinked silicone polymers such as polymethylsilsesquioxane, and polymethylmethacrylate spheres. Typical useful particle sizes of these antiblocks range from 1-12 urn, preferably in the range of 2-6 μm.

Migratory slip agents such as fatty amides and/or silicone oils can also be optionally employed in either or both film layers, either with or without the inorganic antiblocking additives, to aid further with controlling coefficient of friction and web handling issues. Suitable types of fatty amides are those such as stearamide or erucamide and similar types, in amounts of 100-5000 ppm of the layer. Preferably, erucamide can be used at 500-1000 ppm of the layer. A suitable silicone oil that can be used is a low molecular weight oil of 350 centistokes which blooms to the surface readily at a loading of 400-600 ppm of either or both layers.

The beta crystalline phase in polypropylene differs from the alpha crystalline phase as mentioned previously. The alpha phase is the most common crystalline phase and has a melting point typically of about 164° C. whereas the beta phase is less common and has a melting point typically of about 150° C. Microvoids can form in the substrate during orientation when in the solid state, due to the transformation of the beta crystals into alpha crystals, and this accounts for the white opaque appearance of the inventive film's layer A. These microvoids can collapse upon melting and recooling of the substrate and the white opaque appearance can turn transparent and clear; without being bound by any theory, it is this property that gives the unique non-chemical thermal print opportunities of the inventive film as a thermal printing head is put in contact with the beta-nucleated and microvoided layer A and is activated.

Beta nucleating agents are well-known and studied. Truly effective beta nucleators are not common, but effective beta nucleators have been found based on materials such as: pimelic acid supported on nano-CaC0 3; amides of dicarboxylic acid (e.g. N,N'-dicyclohexylnaphthalene-2,6-dicarboxamide; aryl dicarboxylic acid amide); two-component beta nucleating agents of organic dibasic acids (such as pimelic acid, azelaic acid, o-phthalic acid, terephthalic acid, isophthalic acid) and oxide, hydroxide, or acid salts of a Group II metals (e.g. magnesium, calcium, barium); gamma-crystalline form of quinacridone colorant; aluminum salt of 6-quinizarin sulfonic acid; bisodium salt of o-phthalic acid. Beta nucleating agents are conveniently obtained as a commercial masterbatch in a polypropylene carrier resin; a suitable one for use is Mayzo Corporation's BNX® MPM1112 grade beta nucleant polypropylene masterbatch with melt flow rate of 12 g/10 min at 230° C., dual melting point of 150-155° C. for beta crystal phase and 162-167° C. for alpha crystal phase (as measured on a 2 wt % letdown ratio of the masterbatch in propylene homopolymer resin via second heat using a differential scanning calorimeter), and specific gravity of 0.90 g/cm$^3$. Suitable amounts of this masterbatch to use in layer A of the inventive film is from about 0.5 to 3.0 wt % of the layer, preferably about 1.0 to 2.0 wt %, and more preferably, about 1.1 wt % to 1.8 wt %.

For the contrasting color layer B of this coextruded two-layer film embodiment, carbon black pigment may be used (although other contrasting colors may also be used). Carbon blacks are commonly and widely used as pigments, colorants, and fillers for rubber and plastic products. Carbon blacks are typically produced from the charring of organic materials such as wood or bone; or the incomplete combustion of petroleum products and/or vegetable oils. Carbon black pigments are most conveniently used and handled in a masterbatch form and a suitable one for the present invention can be obtained from Ampacet Corporation as grade 19114 FDA Black carbon black pigment in a polypropylene carrier. This masterbatch has typical properties of a 4 g/10 min melt flow rate at 230° C., melting point of 160-165° C., and density of 1.13 g/cm$^3$. Suitable amounts to use in layer B for a suitable dark color is about 1-20 wt % of the layer, and preferably, about 6-9 wt %.

The beta-nucleated resin layer A can be 20 μm to 200 μm in thickness after monoaxial orientation, preferably between 30 μm and 150 and more preferably between 70 μm and 100 μm in thickness. The coextruded layer B of this embodiment can be between 2-200 μm in thickness, but any thickness may be chosen that is suitable for the contrast ratio between the clear and dark areas after thermal printing. The main criteria is to ensure a thick enough coextruded layer B to reasonably and sufficiently contain enough pigment to provide a good contrasting color. Preferably, the thickness of both A and B layers combined should be in the range of 25 to 200 μm, more preferably, 100 to 200 μm. The ratio of layer A to layer B thickness can be varied and optimized to meet specific end-use applications for thermal print substrates and labels.

The surface of layer A opposite layer B can also be surface treated with either an electrical corona-discharge treatment method, flame treatment, atmospheric plasma, or corona discharge in a controlled atmosphere of nitrogen, carbon dioxide, or a mixture thereof, with oxygen excluded and its presence minimized. The latter method of corona treatment in a controlled atmosphere of a mixture of nitrogen and carbon dioxide results in a treated surface that comprises nitrogen-bearing functional groups, preferably at least 0.3 atomic % or more, and more preferably, at least 0.5 atomic % or more.

In the above embodiment of a coextruded two-layer film, the respective layers can be coextruded through a multi-layer compositing die such as a 2-layer die, and cast onto a chill roll to form a solid film suitable for further processing. In the case of a single layer film, the respective layer can be extruded through a single-layer die and cast onto a chill roll to form a solid film suitable for further processing. Extrusion temperatures are typically set at 235-275° C. with a resulting melt temperature at the die of about 230-250° C. Preferably, the extrusion profile of beta-nucleated layer A is a "reverse" temperature profile in which the feed zones of the extruder are set higher than the final zones. In this case, suitable extrusion temperature settings are from about 271° C. in the initial feed zone, to about 240° C. in the final zone. Filter and melt pipe temperatures were set at about 240° C.; die temperature was about 232° C.

The inventive laminate film was extruded into a sheet form and cast onto a cooling drum at a speed of 6 to 15 mpm whose surface temperature is controlled between 99° C. and 104° C. to solidify the non-oriented laminate sheet. These higher casting temperature conditions are important to form and favor beta crystal formation.

The laminate film was monoaxially oriented in the machine direction (MD) to a certain amount. The amount of monoaxial machine direction orientation should be about 2.5-7 times in the machine direction, preferably 3-7 times, and more preferably 4.0 to 7.0 times. Above a 7:1 machine direction orientation ratio, processability issues may result such as film breakage which can affect the product cost and machine efficiency; below a 2.5:1 machine direction orientation ratio, processability issues such as uneven film profile, gauge bands, and uneven stretch marks can occur which also can result in higher product costs and lower machine efficiencies. Once oriented at the appropriate stretch ratio, the laminate film's layer A appears white and opaque due to the formation of micro voids around the beta crystal sites. It should be noted that that the microvoids of the inventive film were closed-cell, and not open-cell, and thus, did not result in continuous pores which made the microvoided film porous. The density of the microvoided beta-crystalline layer A ranged from about 0.77 to 0.80 g/cm$^3$.

MD orientation temperatures were typically set at about: 113° C. for preheat rolls; 93° C. for stretching; and 126° C. for annealing. Annealing or heat-setting in the final sections of the MD orientation unit was used to help reduce internal stresses within the laminate film and minimize heat shrinkage and maintain a dimensionally stable mono-axially oriented film.

The uniaxially oriented sheet was then optionally passed through a discharge-treatment process on one side of the film (i.e. the side of layer A opposite layer B) such as an electrical corona discharge treater at a watt density of about 2.4 watt/ft$^2$. The one-side treated film was then wound into roll form. The finished article appeared as a film with one side white (layer A) and the opposite side dark (layer B).

Further embodiments may be contemplated as well. In one embodiment, it may be contemplated to produce at least a single layer A only of the mono-axially oriented microvoided film comprised of a propylene-based polymer and the betacrystalline nucleating agent or masterbatch, and laminating film A to a second, standalone, dark or contrasting colored or pigmented film or substrate C by means well-known in the art with an adhesive. This adhesive lamination may be accomplished by using any number of aqueous or solvent-borne adhesives (e.g. 2-part urethane) via well-known solution coating methods including, but not limited to, gravure or rod coating methods; solventless-lamination methods including, but not limited to, extrusion lamination using molten solventless adhesives such as low density polyethylene, or hot melt systems; solventless adhesive systems such as UV or electron beam curable adhesives using application methods including, but not limited to, gravure or rod coating methods. Such adhesives may be applied to one side of the colored film C or to one side of the opaque micro-voided beta-crystalline propylene-based polymer film of layer A as desired for the lamination process.

The colored film or substrate C of the above embodiment may be opaque or translucent, but should be a separate film from the film made of layer A. It can be produced in a separate film-forming process as the film of layer A. For example, one could extrude (or coextrude a multi-layer film) film C as including a propylene-based film and carbon black of the formulation described previously for layer B. Film C could range in thickness including, but not limited to, from 1 μm to 100 μm as desired. The contrasting colored film C may be comprised (but not limited to) of: paper; paperboard; cellulosic films; metal foils and films; polymeric film or films including polypropylene, polyethylene, polyethylene terephthalate, polyester, nylon, polylactic acid, polystyrene, other polymers; metallized substrates (e.g. paper or polymeric films); or combinations of substrates.

In another embodiment, it may be contemplated to apply a contrasting colored ink or pigmented coating to one side of the film of layer A. For printing an ink or applying a pigmented coating to one side of the layer A film, it may be desirable to discharge-treat the side of interest of the film, to help promote wet-out and adhesion of the ink or coating. Primers or other adhesion promotes may be used as well for this purpose. In the case of printing, an ink—e.g. a black ink or other contrasting colored ink could be applied to one side of the film of layer A by means well-known in the art such as gravure roll or flexographic plates. The ink may be water-based, solvent-based, or solventless type that is cured by UV or electron beam. A contrasting colored coating may also be applied to one side of the film including layer A. For example, a carbon black containing polymeric coating may be extrusion-coated on one side of the film including layer A; alternatively, an aqueous or solvent-based coating may be applied to one side of the film including layer A via gravure or rod coating or other means well-known in the art; further, both an ink and a coating may be applied together to one side of the film including layer A, in which the ink is applied directly to the film and the coating applied on top of the ink. The latter may be advantageous in that the coating—being thicker than the ink—may add additional opacity and contrast to support the ink pigment or color, and need not be the same color as the ink. The coating may be white opaque (same color as the film including layer A) for example as long as the ink between the coating and layer A film is of a contrasting color to the layer A film. In addition, the coating may also be useful to help protect the ink layer from scuffing or wear (and may also be transparent or unpigmented if used for this purpose). It could also be contemplated to coat or deposit a metallic layer (e.g. aluminum metallization) to provide a suitable contrast.

In the above embodiments, it could further be contemplated that the film including layer A could also be a coextruded multi-layer film, for example, at least a 2-layer coextruded film, in which both layers A and second coextruded layer B are both comprised of the propylene-based polymer and the beta-crystalline nucleating agent. This multi-layer film could then be laminated to the separate contrasting colored layer C or printed on one side with a contrasting colored pigment or ink.

In a typical thermal printing application, the thermal print head (or heads) is used to transfer ink or dye from the ink or dye donor elements (e.g. thermal transfer ink-containing film or ribbon) to a receiving or recording element (e.g. print receiving substrate). Alternatively, the thermal print head may contact a substrate containing a thermally sensitive ink or dye that changes color or becomes visible upon application of heat from the thermal print head. Other known sources for transferring or activating thermal inks or dyes, such as lasers, may be used. A thermal ink or dye transfer assemblage may include 1) an ink or dye-donor element; 2) an ink or dye receiving or recording element, the ink or dye-receiving element being in a superposed relationship with the ink or dye-donor element such that the ink or dye layer of the donor element may be in contact with the ink or dye-receiving layer of the receiving element.

In the case of the present invention, as an example using the embodiment including a coextruded 2-layer film of a beta-crystalline nucleated white opaque propylene-based polymer layer A and a contrasting colored propylene-based layer B, it is contemplated that the laminate film structure of layers A and B are fed into the thermal print head assembly such that the side of layer A including the beta-nucleated and microvoided layer is subjected to heat treatment from the thermal print head. Upon activation of the thermal print head heating elements, sufficient thermal energy is transferred into layer A to partially melt the layer in the region of thermal contact, thus transforming the micro-voided beta crystalline regions into alpha crystals. This renders the appearance of the thermally-contacted areas from white (or opaque) to clear (or transparent). Thus, the physical contrast between the opaque portions and the transparent portions can be visible by eye (looking through the film from the layer A side wherein the contrasting layer B underneath shows through the clear portions of Layer A) and information conveyed via thermal printing head onto the inventive receiving substrate without the use of chemical inks or dyes.

In yet another embodiment, it could be contemplated that the nonchemical thermal print film of the invention could include only a single layer A including a propylene-based polymer and an amount of beta-nucleating agent. After orientation, the essentially mono-Layer film has a micro-voided white opaque appearance and, after passing through the thermal print head, the thermally "printed" areas of layer A turn from white to clear, thus providing enough contrast to discern information such as alphanumeric lettering and/or barcodes or other information.

It can also be contemplated that in addition to thermal print heads, ultrasonic energy may also be sufficient to collapse the beta-crystalline micro-voids, thus converting the white opaque regions into transparent regions where the ultra-sonic energy is directed.

This invention will be better understood with reference to the following examples, which are intended to illustrate specific embodiments within the overall scope of the invention.

Example 1

Figure 1:
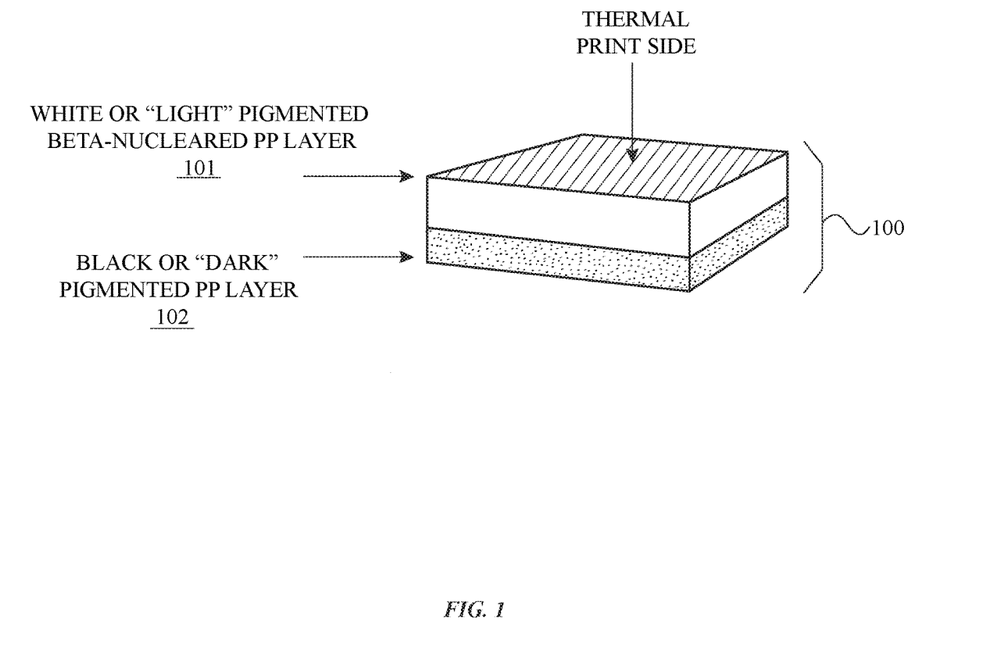

A two-layer mono-axially oriented film (MOPP) was made using a monoaxial orientation process with two distinct coextruded layers. The two layers comprised a black pigmented layer B and a white opaque beta-crystalline nucleated layer A and the laminate film appeared dark colored on one side (layer A) and light colored on the opposite side (layer A) after orientation. Layer A was composed of about 98.2 wt % of an impact propylene copolymer Braskem TI4015F and about 1.8 wt % of a betacrystalline nucleating masterbatch Mayzo MPM1112. Layer B was composed of about 94 wt % Braskem TI4015F and about 6 wt % of a carbon black pigment masterbatch Ampacet 191114. The coextruded film substrate was made via co-extrusion through a die, cast on a temperature controlled drum at 104° C., oriented in the machine direction through a series of heated and differentially sped rolls at various orientation draw ratios (MDX) of about 4:1. Once oriented the clear layer B appeared whitish and opaque due to the formation of microvoids from the beta-nucleation. Thus, the finished article appeared as a film with a black side and a white side (FIG. 1). The film was heat-set or annealed in the final zones of the MD orientation section to reduce internal stresses and minimize heat shrinkage of the film and maintain a dimensionally stable mono-axially oriented film. After orientation, the finished thickness of the 2-layer laminate coextruded film was nominal 150 μm or 6000G. The thickness of the beta-nucleated layer A was about 135 μm; the thickness of the carbon black pigmented layer B was about 15 μm.

Example 2

Example 1 was substantially repeated except that the amount of Mayzo MPMIII2 beta-nucleating masterbatch was about 2.2 wt % and about 97.8 wt % Braskem TI4015F in layer A.

Example 3

Example 1 was substantially repeated except that the amount of Mayzo MPMIII2 beta-nucleating masterbatch was about 1.2 wt % and about 98.8 wt % Braskem TI4015F in layer A; the amount of carbon black Ampacet 191114 was about 9 wt % and about 91 wt % Braskem TI4015F in layer B; and the overall thickness was about 100 μm with the A layer about 90 μm and the B layer about 10 μm.

Example 4

A mono-axially oriented film was made as in the above Example 1. However, in this case, both layers A and B were comprised of the beta-nucleated impact copolymer of about 98.2 wt % of Braskem TI4015F and about 1.8 wt % of Mayzo MPM III2, effectively producing a single layer film of the same composition throughout. A black pigmented film was obtained commercially from an outside vendor and adhesively laminated with a 2-part urethane adhesive to the beta-nucleated white opaque film.

Figure 2:
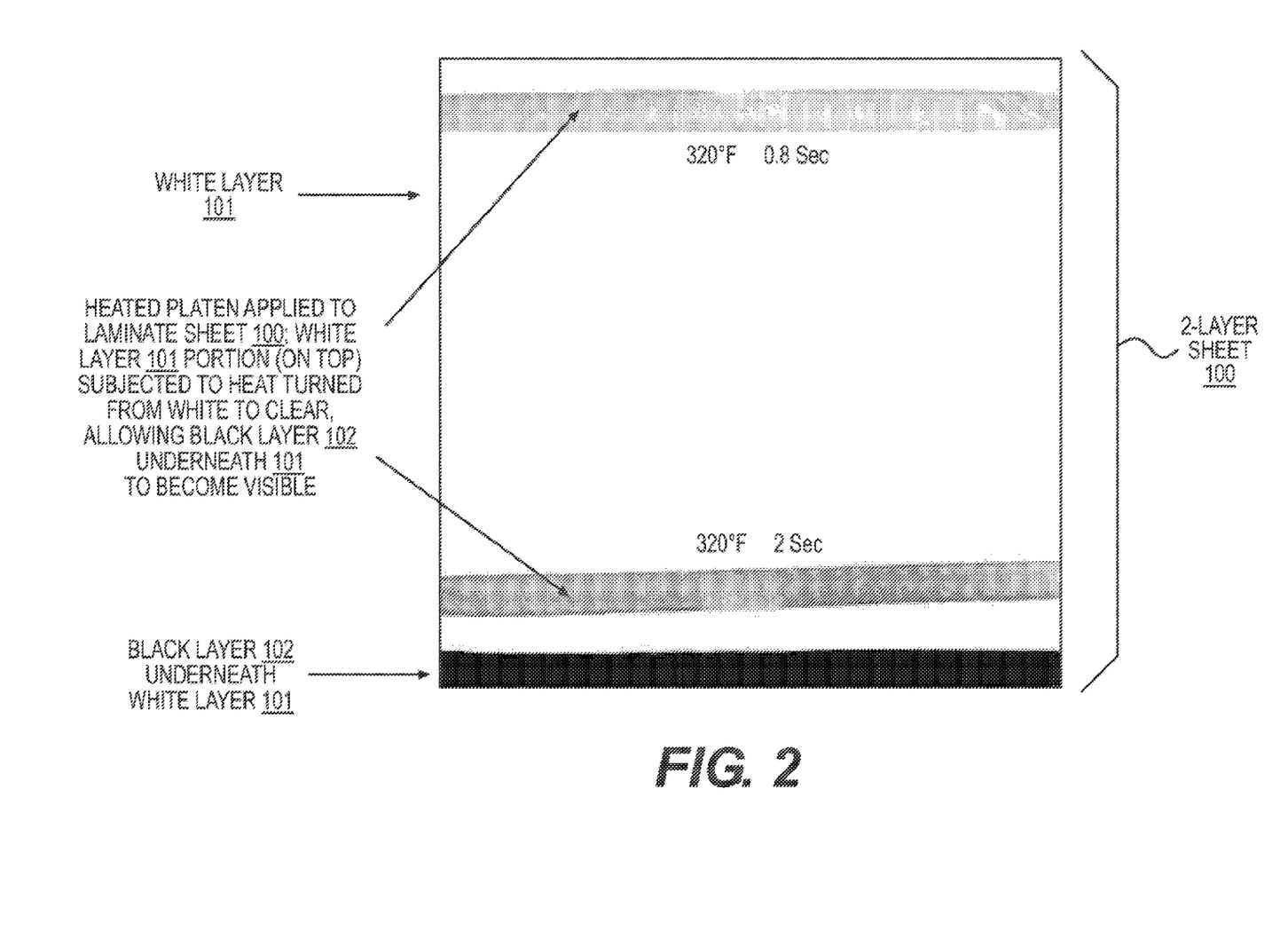
FIG. 2 is a top view of a thermally exposed 2-layer film sheet 100 of the invention showing the change in appearance where a heated platen was applied to white beta crystalline micro-voided top layer 101, thus changing its appearance from white to clear in that area, and allowing black pigmented bottom layer 102 to show through the transparent portion of top layer 101.

In the Examples above, thermal printability was tested using a laboratory heat sealing device Sentinel model12ASL wherein the beta-crystalline micro-voided white opaque side of the film (layer A) was exposed to the heated platen (the other sealing platen or jaw was unheated) of the heat sealer at 320° F. (160° C.) at a dwell time of 0.8 and 20 psi pressure, whereupon that portion of the white surface of layer A subjected to heat, turned transparent and lost its opacity, allowing the darker layer B beneath to show through (FIG. 2). A second test was also done at the same temperature and pressure, except that the dwell time was increased to 2.0 seconds (FIG. 2).

Basic properties of the Examples are shown in Table 1.

| Example | Light Transm % | Gloss A-side | Gloss B-side | Color A-layer L* | a* | b* | Blackness B-layer | Density A-layer g/in³ |
|---|---|---|---|---|---|---|---|---|
| Ex 1 | 12.5 | 17 | 18 | 95.84 | −0.35 | 0.17 | 1.39 | 0.79 |
| Ex 2 | 14.6 | 19 | 16 | 94.36 | −0.29 | 0.34 | 1.34 | 0.78 |
| Ex 3 | 20.3 | 17 | 16 | 95.76 | −0.32 | 0.23 | 1.46 | 0.78 |

Test Methods

The various properties in the above examples were measured by the following methods:

Thermal Printability: Evaluated using a Sentinel sealer model 12 ASL at about 20 psi, 0.5-2.0 second dwell time, with heated flat upper seal jaw Teflon coated, and unheated lower seal jaw, rubber with glass cloth covered. The film sample is placed 24 between the sealer jaws at the desired seal temperature(s) in the Sentinel sealer (e.g. 320° F. or 160° C.). Temperatures may be increased or decreased at desired intervals, e.g. 10° F. increments for further evaluation of determining the clarity of the thermal "printability".

Light Transmission of the film was measured by measuring a single sheet of film using a light transmission meter like a BYK Gardner model "Haze-Gard Plus®" substantially in accordance with ASTM D 1003.

Gloss of the film was measured by measuring the desired side of a single sheet of film via a surface reflectivity gloss meter (BYK Gardner Micro-Gloss) substantially in accordance with ASTM 0 2457 at a 60° angle.

Wetting tension of the surfaces of interest was measured substantially in accordance with ASTM D2578-67.

Lightness L*a*b* was measured using a spectrodensitometer such as X-Rite model 528.

Blackness was measured using an optical densitometer such as Tobias Associates model TBX transmission densitometer.

Density of the film was calculated by taking a stack of 10 sheets (letter paper size e.g. 8.5 inches by 11 inches) of film and cutting them via a die of area 33.69 cm² and weighing the cut sheets on an analytical scale. The 10 sheets are also measured for thickness using a flat-head micrometer to get an average thickness of the film. The measured weight and thickness is then used in a calculation to obtain density:

$$\frac{\text{Weight (g)}}{\text{Thickness (cm)} \times \text{area (cm}^2)} = \text{Density (g/cm}^3)$$

Film yield is calculated using film density and thickness by the following formula:

$$\frac{453.59}{\text{Density}(\text{g/cm}^3) \times (2.54)^3 \times \text{thickness (inches)}} = \text{Yield (in}^2/\text{lb})$$

Tensile properties such as Young's modulus, ultimate strength, and elongation are measured substantially in accordance with ASTM 0882.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A multilayer film comprising:
   a first layer comprising an opaque beta-nucleated polypropylene-based polymer; and
   a second layer comprising a dark pigment;
   wherein the multilayer film forms an image without using an ink or a dye,
   wherein the multilayer film comprises a biaxially oriented film.

2. The multilayer film of claim 1, wherein the dark pigment of the second layer pigment has a color contrasting with the color of the first layer.

3. The multilayer film of claim 1, wherein the first layer comprises a propylene-based polymer and an amount of a beta-nucleating agent or beta-nucleated propylene polymer.

4. The multilayer film of claim 3, wherein the second layer comprises a propylene-based polymer and an amount of carbon black pigment in propylene-based polymer carrier resin.

5. The multilayer film of claim 1, wherein the first layer comprises micro-voids.

6. The multilayer film of claim 1, wherein the first layer comprises a beta nucleating agent selected from the group consisting of pimelic acid supported on nano-CaCO3;
   amides of dicarboxylic acid including N,N'-dicyclohexylnaphthalene-2,6-dicarboxamide and aryl dicarboxylic acid amide, two-component beta nucleating agents of organic dibasic acids selected from the group consisting of pimelic acid, azelaic acid, o-phthalic acid, terephthalic acid and isophthalic acid;
   oxide, hydroxide, or acid salts of Group II metals;
   gamma-crystalline forms of quinacridone colorants;
   aluminum salt of 6-quinizarin sulfonic acid; and bisodium salt of o-phthalic acid.

7. The multilayer film of claim 1, wherein the first layer can be made transparent upon the application of heat by collapsing the voids in said first layer.

8. The multilayer film of claim 1, wherein the first layer can be made transparent upon the application of ultrasonic energy.

9. The multilayer film of claim 1, wherein the first layer comprises a transparent dye.

10. The multilayer film of claim 1, wherein the dark pigment of the second layer comprises a carbon black.

11. The multilayer film of claim 9, wherein the second layer comprises a transparent dye that is of a different hue or color than that of the first layer.

* * * * *